Jan. 4, 1944. P. HAAS ET AL 2,338,507
METHOD AND APPARATUS FOR MANUFACTURE OF ELECTRON TUBES AND THE LIKE
Filed Sept. 12, 1942 3 Sheets-Sheet 1

INVENTORS
PAUL HAAS &
RICHARD G. BENNETT
BY
ATTORNEY

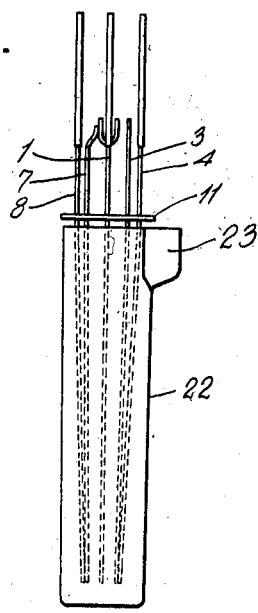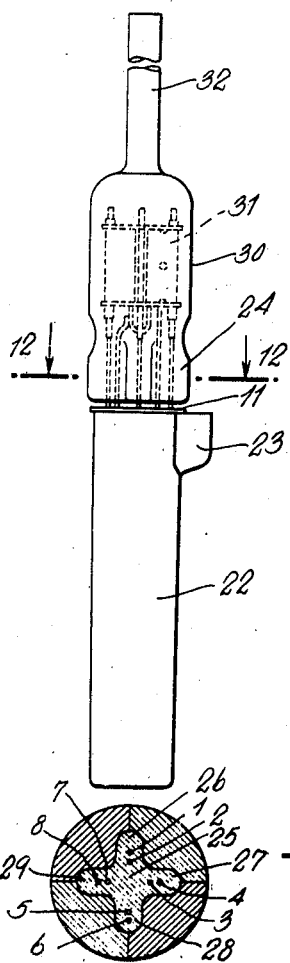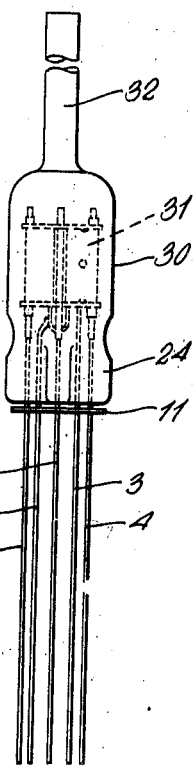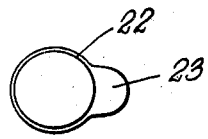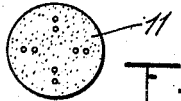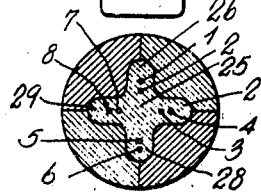
INVENTORS
PAUL HAAS &
RICHARD G. BENNETT
BY
ATTORNEY

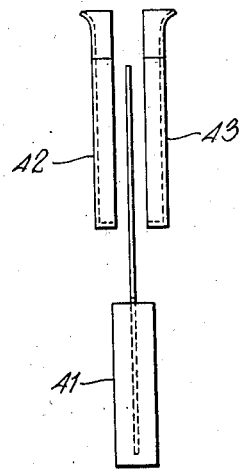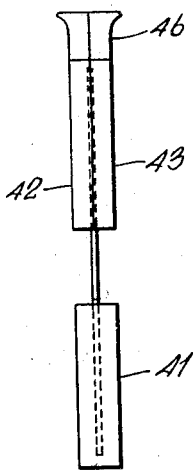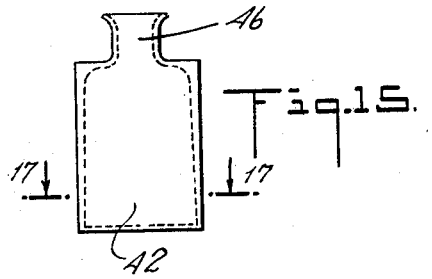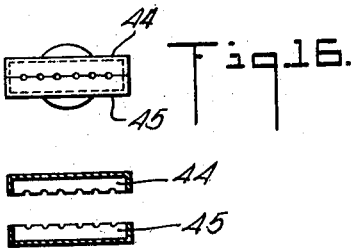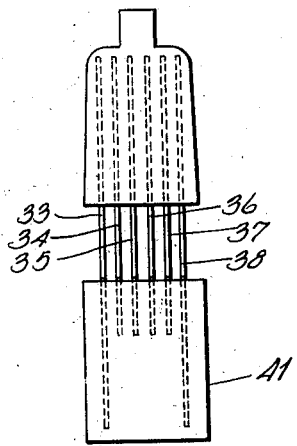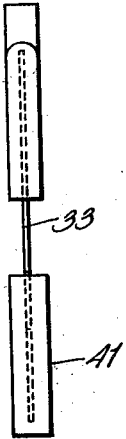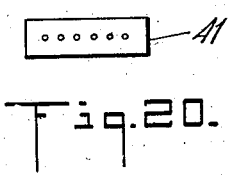

Patented Jan. 4, 1944

2,338,507

UNITED STATES PATENT OFFICE 2,338,507

METHOD AND APPARATUS FOR MANUFACTURE OF ELECTRON TUBES AND THE LIKE

Paul Haas, Emporium, and Richard G. Bennett, Williamsport, Pa., assignors to Sylvania Electric Products Inc., Emporium, Pa., a corporation of Massachusetts Application September 12, 1942, Serial No. 458,176

15 Claims. (Cl. 250—27.5)

This invention relates to methods of manufacturing electric discharge tubes, and in particular to tubes of small dimensions.

In the conventional method of making electron discharge devices, for example radio receiving tubes and other mass production type tubes, each tube is usually composed of two parts. One is the so-called mount, incorporating the stem or header through which lead-in wires are sealed in a vacuum-tight manner, and on which are fixed and supported the tube electrodes, which are appropriately connected to respective lead-in wires. An envelope or bulb is then sealed to the stem or header thus producing a vacuum-tight vessel in which the tube electrodes are permanently enclosed. An exhaust or tubulation may be attached to the stem or to a convenient point of the envelope for the purpose of exhausting the bulb. After exhaust, the tubulation is sealed off.

In small electron tubes, e. g. hearing aid and other similar types, it is sometimes convenient to omit the stem or header. In those cases, the assembly of the electrodes is made directly on the lead-in wires, and it is, of course, necessary to provide some spacing means for the lead-in wires and for the supports in order to maintain them in the proper spaced relation during the mounting operation. The lead-in wires may be spaced by a glass bead, and when the mount is finished it is introduced into the open end of a glass bulb which is closed at the opposite end. The open end of the glass bulb is then heated and the molten glass is pressed by appropriately designed jaws, around and between the lead-in wires so as to form a vacuum-tight seal. In that way, a mechanical support is provided for the mount inside the envelope which takes the place of the header or stem of the tube first described. The enclosure formed in this way is then exhausted through a tubulation which is sealed to a convenient point of the glass bulb. A press of this type is referred to as an "outside press."

The process of making a tube with an outside press saves the operation of stem making. But another operation must be gone through, which consists in properly spacing the lead-in wires from each other for the purpose of mounting. As mentioned hereinabove, the lead-in wires may be sealed together and spaced by a glass bead which remains inside the finished bulb after the sealing-in process. This increases the length of the tube, which is sometimes undesirable. Furthermore, the method is not very practical in large scale production, especially for tubes containing a large number of electrodes. If the lead-in wires are soft and flexible, the tube mounter needs a rigid jig or holder for supporting the parts during the assembling. Each lead-in wire assembly must be placed into such a jig before the mounting operation is started, and after mounting, it must be taken out again. A similar jig or holder must be provided for the sealing-in operation and time will be lost again for each individual tube before sealing-in.

In order to avoid repetition of this threading and unthreading, a large number of holding jigs may be made up so that each lead-in wire assembly is provided with an individual jig or holder before it passes on to the mounting operators. Each mount is passed on with its holder to the sealing machine and the finished mounts thus remain in the jigs during sealing-in. The sealed tube is removed from its holder before exhausting.

An alternative way of making these holders is to take a short metal rod or bar of appropriate length and cross section, drill holes into it parallel to each other, properly spaced, for taking up the lead-ins or welds, and provide clamping means for preventing the lead-in wires from sliding longitudinally with respect to each other and to the jig. A jig or holder of that kind is expensive as it must be made with precision and care. Damaged holders must be currently replaced, the holes or channels must be frequently cleaned. A large number of them will be needed for large scale production. All these difficulties are avoided according to the invention, by providing a metal stem or holder which is capable of being cast around and between the lead-in wires before mounting. Prior to the casting, the lead-in wires are spaced in a block similar to the stem blocks used in the ordinary procedure of stem making. After the casting, the stem or holder remains connected during the mounting and sealing-in processes. After sealing-in, an operator dips the cast metal holders which now form a unit together with the sealed-in tube, into a receptacle containing the molten metal. The metal stem or holder melts into the molten metal in the receptacle because of the heat transferred to it from the surrounding molten metal. Preferably, a metal is used that melts at low temperature, but the melting point of the metal must be high enough to withstand the sealing-in temperatures. We have found that ordinary type metal is a very appropriate alloy for the purpose.

This method eliminates the expensively prepared jigs, and the replacement and maintenance of damaged holders. At the end of the cycle, the type metal accumulates in the receptacle and is transported back in bulk to the casting operator. Very little material is lost in melting and the casting material may be used over and over again for an indefinite number of cycles.

Accordingly, it is an object of the invention to provide improved methods and means for mounting and sealing-in electron tubes of the type known as "outside press" tubes.

Another object of the invention is to provide a lead-in wire spacer and mounting holder for tubes of the outside press type, which spacer and holder is made by a rapid casting operation.

Another object relates to reproduction of a temporary tool during an indefinite number of cycles, and using the same batch of raw material. For example the tool may be one that is required in large scale production for mounting and sealing-in radio tubes, lamps etc., and can be formed by repeated casting-resmelting without any great loss of time.

Another object is to provide tubes of the outside press type with materially decreased overall length.

A feature of the invention relates to a method of keeping the flexible lead-in wires of a radio tube or the like, straight and separated from each other during a number of processing steps during which such lead-in wires would be apt to break, deform or become twisted.

Another feature relates to a method which prevents the formation of a metal oxide layer on the glass stem between the lead-in wires during the sealing-in process. Ancillary to this is the reduction in the electric leakage over the press surface between the lead-in wires of the finished tube.

A few of the embodiments of the invention will now be described in connection with the drawings in which, Fig. 1 is an elevational view of the lead-in wire loading and supporting block.

Fig. 6 is a view of the stem assembly before mounting of the electrodes.

Fig. 7 is a bottom view of Fig. 6.

Fig. 8 is a view of a sealed-in tube just prior to melting of the fusible metal stem holder.

Fig. 9 is a view of the removable stem protecting washer shown in Fig. 6.

Fig. 10 is a plan view of the washer.

Fig. 11 is a view of the sealed-in tube after melting of the fusible metal stem holder.

Fig. 12 is a sectional view of the press portion of Fig. 8 taken along the line 12—12 thereof.

Fig. 13 shows a modified bi-part mold for making a modified form of outside press tube.

Figure 1:
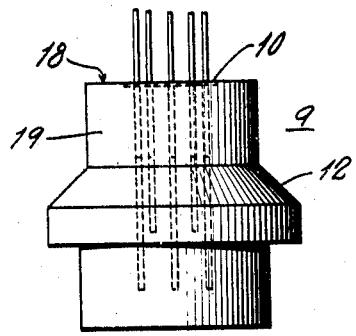
Figure 2:
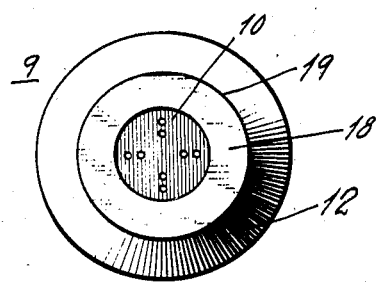
Fig. 2 is a top plan view of Fig. 1.
Figure 4:
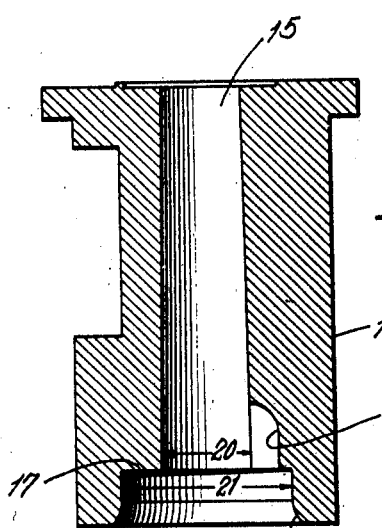
Fig. 4 is a sectional view of Fig. 3 along line 4—4 thereof.

Fig. 14 ishows the mold of Fig. 13 in molding relation with the lead-in wires.

Fig. 15 is a front elevation of the bi-part mold.

Fig. 16 is a bottom view of Fig. 15.

Fig. 17 is a section of Fig. 15 along the lines 17—17.

Fig. 18 is a view of the stem-block and molded lead-in holder after removal from the mold.

Fig. 19 is a side view of Fig. 18.

Fig. 20 is a bottom view of Fig. 18.

Referring to the embodiment of Figs. 1 to 11, there is shown apparatus for manufacturing a tube of the glass bulb type with a four-wing external press, and with eight lead-in wires sealed through the press wings symmetrically around the center thereof, with a pair of lead-ins passing through each wing. Each lead-in wire consists of a relatively stiff portion of nickel welded to relatively flexible portion, and if desired an intermediate short portion of a special alloy wire. The first step in assembling the tube is to load the lead-in wires 1—8 with the nickel end portions extending into the stem block 9 (Fig. 1) which block is of rotational symmetry and has a series of eight channels arranged in pairs around the central vertical axis of the block, the four inner channels and the four outer channels being arranged along two concentric cylindrical paths. The channels are not all of the same length, since some of the lead-in wires must be shorter than others, depending upon the particular electrode structure and arrangement desired in the finished tube. The upper face of block 9 has a shallow central circular recess 10 to receive the specially coated metal protective washer 11 (Figs. 9 and 10) for purposes to be described. Vessel 14 is substantially cylindrical and is open at the top and bottom, and its bore 15 is slightly tapered, and with the lower end provided with a radially extending recess 16. The lower end of member 14 has a flat shoulder 17 whtich is adapted to butt against the flat face 18 of block 9 when member 14 is telescoped over the portion 19 of the block. The inner wall of the mold 14 thus surrounds the free ends of the lead-in wires. The diameters 20 and 21 are so chosen that they accommodate snugly the block portion 19, the diameter 20 being slightly smaller than the diameter of the recess 10.

Figure 3:
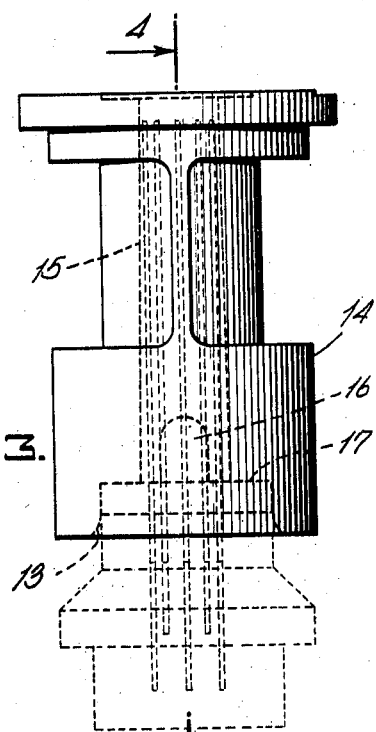
Fig. 3 is an elevational view of the stem mold.
Figure 5:
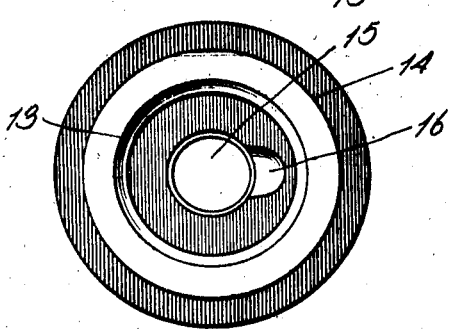
Fig. 5 is a bottom view of Fig. 3.

When the block and mold are in assembled position as shown in Fig. 3, a molten metal such as hot type metal is poured into the top end of the mold cavity 15 whereby the said cavity and pocket 16 are filled with the molten metal. The mold 14 is air or water cooled in any convenient manner causing the type metal to harden substantially immediately after it is poured into the mold. The stem block 9 is then pulled off and the assembly of the eight lead-in wires, rigidly and properly spaced within the cast metal stem 22, is romoved from the mold. The hardened metal stem 22 (Fig. 6) together with the integral cast lug 23 serves as a convenient handle for the operator during subsequent mounting and aligning of the various electrodes which are attached to the nickel end portions of the lead-ins. Furthermore the metal stem 22 serves as an accurate locator for the cutting and bending operations to which the free ends of the lead-ins are subjected before mounting of the electrodes. Thus as shown in Fig. 6 the free ends of the "short" lead-ins are shown bent at the desired angle to align them with the corresponding parts or with the side rods of the electrodes to which they are to be subsequently welded. The cutting and welding and bending of the free ends have no effect on the accurate spacing of the wires while they are imbedded in member 22. This is of extreme importance in the manufacture of very small tubes where the diameter of the press through which the wires are sealed is as small as 0.25 inch or less.

The various electrodes of the assembly as represented by the dotted outline (Fig. 8) are then assembled and connected to the free ends of the lead-ins, after which the type metal stem 22 carrying the mount assembly is inserted into a lower chuck provided for it in the usual sealing-in machine. Lug 23 may be used to determine the position or orientation of the lead-ins with respect to the sealing-in jaws, which form the solid glass press 24. In the particular tube shown, the press is of the four wing type consisting of a center glass mass integrally molded with four radially extending ribs or wings 26—29 (Fig. 12). Since mechanism for forming this type of press is wellknown in the art detailed description thereof is not required beyond stating that the tubular glass member 30 which is to form the enclosing bulb for the mount, is heated and pressed at the region where the press is formed, by a four-wing expansible chuck or sets of jaws which form the glass mass 25 with its wings 26—30 and at the same time molding the wings into vacuum-tight sealing relation with the various pairs of lead-ins passing through each wing. It will be understood that the invention is not limited to any particular shape of press as it may be flat or button shape, or it may be planar as disclosed for example in U. S. Patent No. 1,566,293, or it may be provided with three or more radial wings as desired. In fact the cross-section of the press transverse to the lead-ins may be circular, square, triangular, star shape or the like.

The protective metal disc 11 is preferably coated with a layer of an insulator material, e. g., magnesium oxide, on its uper face, i. e. the side which faces the mount. This coating prevents contact of the hot glass which is pressed against the face of the disc in forming the press during the sealing-in operation. Otherwise the contact of the heated glass with the metal of the washer would result in the transfer and burning-in of metal oxide from the disc on and into the lower end of the press. Such a metal oxide layer between the closely spaced lead-ins is very detrimental, particularly as it introduces undesirable electrical leakage between the lead-ins.

Fig. 8 shows the sealed-in tube on the metal stem 22, the electrode assembly or mount being indicated by numeral 31. The bulb 30 has at its upper end the exhaust tubulation 32. Fig. 11 shows the tube after the metal cast stem has been melted off by dipping it into a receptacle of molten type metal. The lead-ins which were imbedded in the metal stem are now free and visible. The metal disc 11 is then unthreaded from the lead-ins and the tube is ready for exhaust, after which the tubulation 32 tipped off in the usual manner.

Referring to Figs. 13–20 there is shown a modified form of tube and a correspondingly modified form of molding device. In this embodiment, the eight lead-ins are arranged in linear array in substantially the same plane, and the press of the tube is flat or substantially rectangular in shape such as disclosed for example in U. S. Patent No. 1,566,293. The usual lead-ins 33–38 are loaded into a block 41, having a series of accurately spaced bores to receive the ends of the lead-ins some of which may be shorter than others as shown in Fig. 18. A bi-part mold comprising the two separable sections 42, 43, is then assembled around the upper ends of the lead-ins. Preferably the mold cavity is roughly rectangular in horizontal section, the lower end being defined by the abutting half bottoms 44, 45, each of which is cut out along its edge so that when assembled the lead-ins are gripped and the bottom of the mold cavity is closed. The two mold sections are shaped at their upper ends to form a pouring spout 46 into which the molten type metal is poured either at normal atmospheric pressure or at higher pressure to insure filling the entire mold cavity. The mold may be air or water cooled to expedite hardening of the type metal around the lead-ins, after which the mold is removed and then the electrode mount is attached to the lead-ins as above described. Figs. 18 and 19 show the appearance of the molded metal stem and lead-ins after removal of the mold.

The metal stem with the imbedded lead-ins is then inverted from the position shown in Fig. 18, to enable the operator to assemble the electrodes on the free ends of the lead-ins (i. e. the ends which were previously in the block 41). While the lead-ins are thus rigidly and accurately held in spaced relation and with the electrodes mounted thereon, a glass tube may be telescoped over the mount to a point below the mount, whereupon the glass tube is molded, pressed or otherwise formed to a flat external press as described in said Patent No. 1,566,293.

As an alternative method, the lead-ins may be clamped into a stem block with the free ends extending beyond the block. The block can then be inverted, and the free ends of the lead-ins introduced into the molten type metal contained in the mold cavity through the top opening of the mold. Upon hardening of the type metal, the mold is removed, leaving the lead-ins imbedded in the hardened metal stem.

The advantages of the methods described, as compared for example with that of said Pat. No. 1,566,293 are: first, the tube mounting or assembling operator has at all times a convenient handle or grip for holding the mount during bending, aligning, trimming, etc., second, there are no free lead-ins or ends which can become entangled, bent or broken during mounting. Third, the overall length of the finished tube can be shortened by the length which would otherwise be required for the internal glass bead of said patent, and the length which is necessary in the patented disclosure, between the glass bead and the press to avoid melting of the bead during the heating and forming of the press.

During sealing-in and formation of the external press, it is necessary to protect the type metal stem from melting. This can be effected by a split metal plate consisting of two horizontal sliding doors or shields above the stem supporting chuck in the sealing-in machine. These doors are opened when the stem is inserted, and are closed-in from both sides against the lead-ins, suitable semi-circular cut-outs being provided in the opposed horizontal edges of the doors to accommodate the lead-ins. If desired these shielding doors can be specially cooled by air blast or by water.

While certain specific embodiments have been described herein, it will be understood that various changes may be made without departing from the spirit and scope of the invention.

What we claim is:

1. The method of manufacture of an electric device such as an electron tube or the like, having lead-ins extending outwardly from an enclosing envelope, which includes the steps of imbedding the ends of the lead-ins in predetermined spaced relation in a readily meltable rigid body, attaching a mount to the free ends of said lead-ins while retaining the first mentioned ends imbedded in said body, and then removing said body to free said imbedded ends.

2. The method according to claim 1 in which said body is removed by melting.

3. The method of temporarily maintaining parts of an electron tube or the like in rigid spaced relation while performing other operations on the parts which parts have spaced extensions, which includes the steps of assembling said parts in predetermined spaced relation, casting a readily meltable body around said extensions, and subsequently melting said body to remove it when the desired other operations have been completed.

4. The method of manufacture of electron devices and the like having a header through which lead-ins externally project and having an enclosing bulb, which method includes the steps of imbedding the ends of said lead-ins in predetermined spaced relation in a mass of hardened but readily fusible metal, attaching an electrode or the like to the free ends of said lead-ins, molding the header to said lead-ins, sealing the enclosing bulb to the header, and then melting said fusible body to remove it from said lead-ins.

5. The method according to claim 4 in which a protective shield is interposed between said rigid body and the header during the molding thereof to prevent transfer of conductive material to the external surface of the header during the sealing-in operation.

6. The method of manufacturing an electric device such as a radio tube or the like and of the external press type, which includes the steps of imbedding the lead-ins in predetermined spaced relation in a rigid body of fusible metal, attaching an electrode or the like to the free ends of certain of the lead-ins, telescoping a glass tube over said electrode and the free ends of said lead-ins, heating and pressing said glass tube in a region between said rigid body and said electrode to form a press through which said lead-ins pass in a vacuum-tight manner, and subsequently melting said body to remove it from said lead-ins.

7. The method of manufacturing an electric device such as an electron tube or the like, which includes the steps of assembling the lead-ins in predetermined spaced relation in a holder, and casting a readily fusible metal body around said lead-ins which body upon cooling forms a rigid mass in which said lead-ins are imbedded.

8. The method of manufacturing an electric device such as an electron tube and the like, which includes the steps of assembling the lead-ins in predetermined spaced relation in a holder, enclosing the ends of the lead-ins in a molding cavity, charging said cavity with a readily fusible metal, allowing said metal to cool to form a unitary rigid body in which the ends of said lead-ins are imbedded, and then removing said body and lead-ins from the mold cavity.

9. The method according to claim 8 in which said lead-ins are enclosed within a tubular mold which is closed at its lower end by said holder, and said metal is charged into the mold cavity by pouring through the top of the mold.

10. Means to facilitate the assembly of an electric device such as an electron tube or the like, comprising a body of hardened readily fusible material for receiving and rigidly holding parts of the device in predetermined spaced relation during subsequent assembly steps, the said parts being temporarily imbedded in said body during said assembly.

11. Means according to claim 10 in which said body is of readily fusible metal.

12. Means according to claim 10 in which said body is of type metal.

13. Means according to claim 10 in which said body is cast around said parts and is formed with an integral holding lug.

14. An electron tube mount having a plurality of externally projecting lead-ins, and means to maintain said lead-ins in fixed spaced relation during assembly operations on the mount, the last-mentioned means comprising a body of hardened readily fusible metal such as type metal in which said lead-ins are temporarily imbedded.

15. In combination, a plurality of lead-ins, a plurality of electrodes supported by said lead-ins, an external press for said lead-ins, means external of the press to maintain said lead-ins in predetermined spaced relation, the last-mentioned means comprising a mass of readily fusible metal such as type metal, into which said lead-ins are temporarily imbedded for maintaining said spaced relation whereby said electrodes can be enclosed within a bulb without requiring additional lead-in spacing means internally of the bulb between the electrodes and the press.

PAUL HAAS.
RICHARD G. BENNETT.